United States Patent [19]

Loscei

[11] Patent Number: 4,685,876
[45] Date of Patent: Aug. 11, 1987

[54] TOGGLE INJECTION MOLDING CLAMPING FORCE MONITOR

[75] Inventor: Anthony A. Loscei, Cincinnati, Ohio

[73] Assignee: Cincinnati Milacron Inc., Cincinnati, Ohio

[21] Appl. No.: 842,954

[22] Filed: Mar. 24, 1986

[51] Int. Cl.⁴ ............................................. B28B 17/00
[52] U.S. Cl. .................................... 425/170; 425/150; 425/173; 425/593; 425/595
[58] Field of Search ............... 425/149, 150, 165, 167, 425/170, 173, 593, 595; 73/779, 862.54

[56] References Cited

U.S. PATENT DOCUMENTS

| | | | |
|---|---|---|---|
| 3,108,470 | 10/1963 | Martin | 73/88.5 |
| 3,402,472 | 9/1968 | Riley | 33/147 |
| 4,088,432 | 5/1978 | Farell | 425/150 |
| 4,301,100 | 11/1981 | Farrell | 425/149 |
| 4,345,890 | 8/1982 | Hemmi et al. | 425/149 |
| 4,370,116 | 1/1983 | Groom | 425/171 |

FOREIGN PATENT DOCUMENTS

| | | | |
|---|---|---|---|
| 213294 | 9/1984 | German Democratic Rep. | 425/170 |
| 1443187 | 7/1976 | United Kingdom | 425/150 |

OTHER PUBLICATIONS

"Methods for Monitoring and Control of Clamp Tonnage on Toggle Machines" by Dennis K. Rideout.

Primary Examiner—Bernard Nozick
Attorney, Agent, or Firm—Daniel P. Worth

[57] ABSTRACT

The mold clamping force exerted in a toggle plastic injection molding machine is measured by determining the amount the tie rods stretch. A link is clamped on a lower tie rod near the backing platen and supports a contact that is adjustable in the direction of tie rod stretch. The contact in turn engages a probe portion of a sensor that is secured to the machine base. The contact, hence the sensor probe, move the amount that the tie rod stretches at the point of clamping. The motion is directly proportional to clamping force which latter can then be adjusted by operating the adjusting nut drive motor a suitable amount.

9 Claims, 7 Drawing Figures

TOGGLE INJECTION MOLDING CLAMPING FORCE MONITOR

The present invention relates to an improved means for monitoring the clamping force of a toggle injection molding machine for plastic material in connection with which it will be described.

Quick and accurate setting of clamping force is important in a toggle plastic molding machine because it is this force which holds the mold shut against the force exerted by the plastic during molding. Present day demands for flexible manufacturing systems in the plastics industry lead to frequent mold changes which in turn increase the demand for quick and accurate means to set and monitor the clamping force. This is so, as is known in the industry, because each mold change has a different requirement for die height adjustment because each mold has a different height. Indeed, temperature of the mold or tie rods can affect machine dimensions, hence the clamping force and may require readjustment during operation due to die height changes.

This is particularly true in a toggle injection molding machine where many of the techniques for setting the clamping force are inaccurate and may lead to mold damage, machine damage, defective product and ultimately to more down time to reset or repair the machine. Optimum performance of the machine is not realized unless clamping force is kept at a correct level.

Two recent publications describe the problem and propose a solution. Both of these are incorporated herein by reference. The references are: Rideout "Setting and Monitoring Toggle Clamping Force" in the February 1985 *Plastics Engineering*, page 48; and a technical paper presented to the Society of Plastics Engineers Nov. 8, 9, 1984 similarly entitled "Methods for Monitor and Control of Clamp Tonnage on Toggle Machines" by Dennis K. Rideout. A copy of the former, being shorter, is submitted herewith.

The present invention directly measures the amount of tie rod stretch or movement near that end having the adjusting nuts on the tie rods, called here the adjusting or the moving end. This movement or stretch is directly proportional to the force. The present invention provides a sensor portion of a monitor on the machine frame or base adjacent the moving end of one of the tie rods. The sensor is provided to measure the amount of tie rod stretch, hence adjusting end movement, which in turn is directly proportional to the clamping force and can be read out directly in units which either represent the clamping tonnage or which are easily convertible to it because of the linear relationship between movement and clamping force or tonnage. The sensor is preferably a linear variable differential transformer (LVDT).

One object of the present invention is to provide a toggle injection molding machine having a system for monitoring the toggle clamping force. An object of the present invention is to provide a system for monitoring the toggle clamping force of a toggle injection molding machine for plastics.

Other objects, advantages and features will become apparent from the following description when read in conjunction with the attached drawings wherein.

Figure 1:
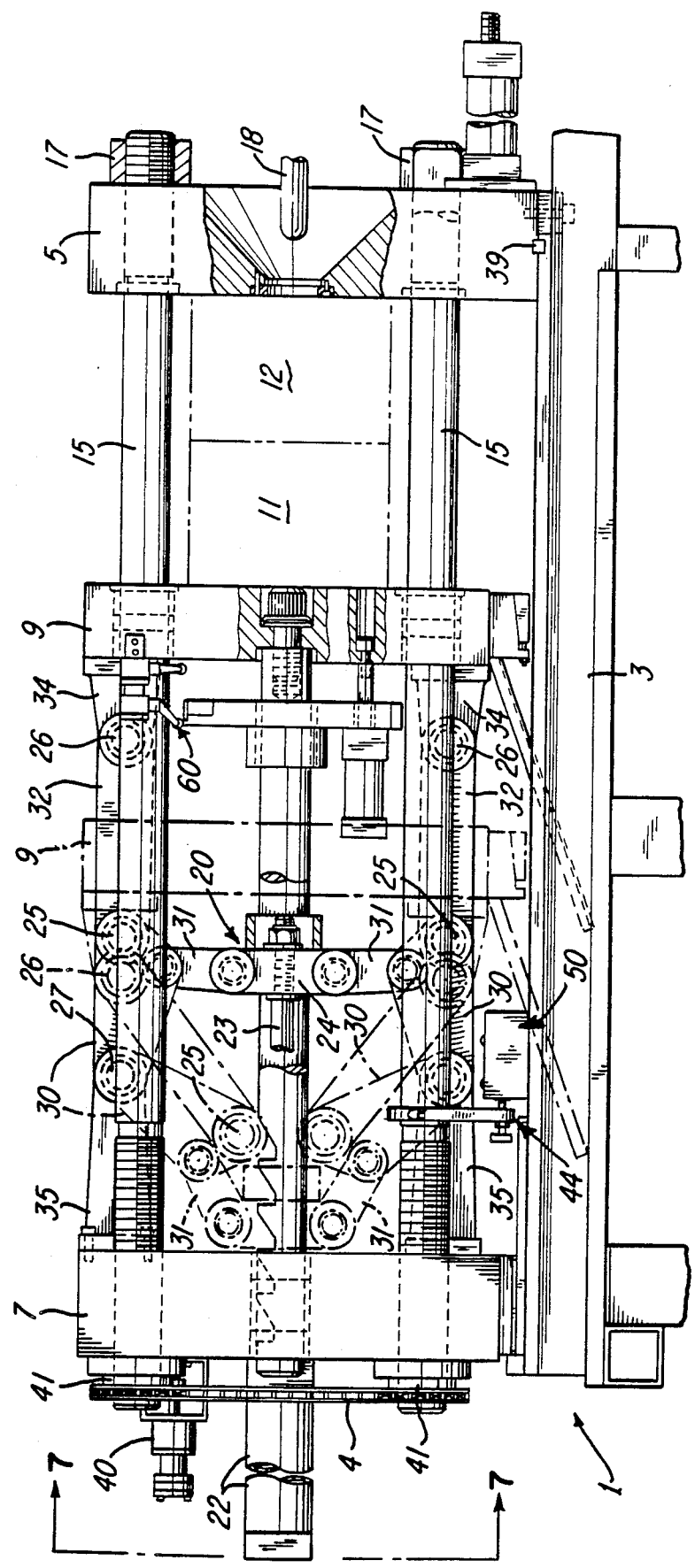
FIG. 1 is a side view of a toggle injection molding machine illustrating a preferred location the sensor assembly or monitoring means of the present invention is attached—solid lines depicting the clamped position and phantom lines depicting mold open position.
Figure 7:
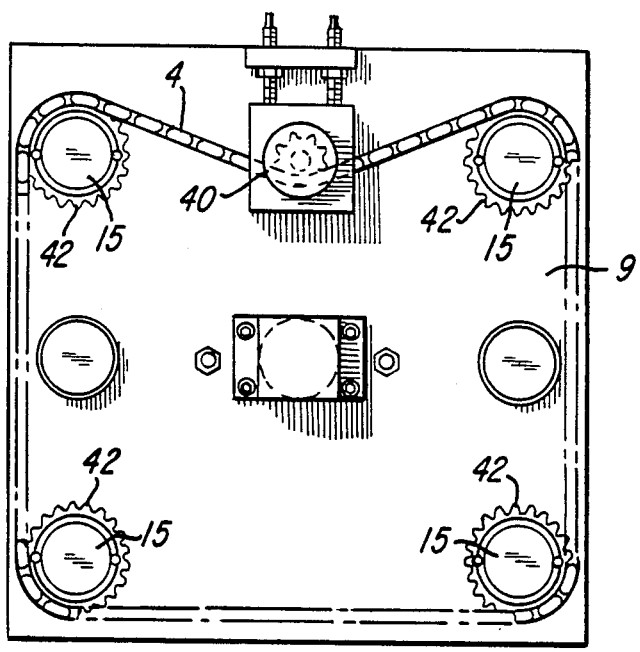
Figure 6:
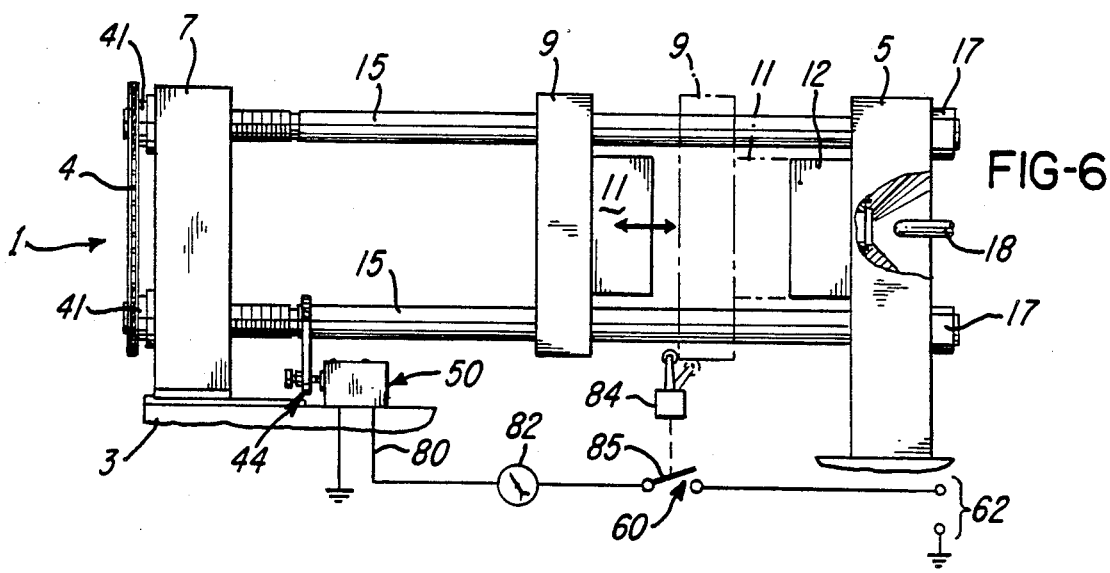
Figure 5:
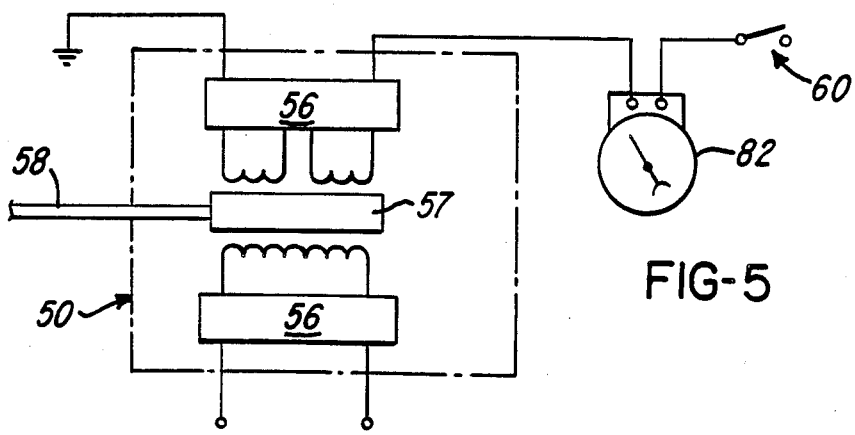
FIG. 5 is a schematic diagram of a linear variable differential transformer (LVDT) and some associated circuitry.

FIG. 6 is a schematic side view of the toggle of FIG. 1 illustrating a representative and preferred means for connecting the FIG. 5 system to electrical power source; and FIG. 7 is an end view on 7—7 of FIG. 1 illustrating the relationship of adjusting nuts (also known as tie bar nuts), sprockets, chain and other components all at the adjusting end(s) of the tie rods and for adjusting the toggle clamping force, i.e. adjusting the die height.

Throughout the drawings and following specification the same reference numbers refer to the same parts. It should be understood, too, that toggle type injection molding machines are old in the art but the instant monitor and its combination with such a machine are aspects of the invention.

Referring first to FIGS. 1 and 7 there is illustrated a typical toggle injection molding machine 1 for plastic molding. It has a frame 3 extending in a generally horizontal direction on which are mounted three platens: a fixed or nozzle platen 5 at the right, a clamp or back platen 7 on the left and a moving platen 9 between the two. Mold halves 11, 12 are mounted on the nozzle platen 5 and moving platen 9. Four tie bars 15 extend between the nozzle and clamp platen and pass through the moving platen, thus providing a sort of guide for the latter. Tie rod nuts 17 connect the tie rods to the nozzle platen. The injection nozzle 18 of the injection unit (not shown) extends through the nozzle platen 5 to mold half 12 mounted on the latter.

A toggle system 20 connects the clamp platen and the moving platen and is driven by a hydraulic clamp cylinder 22 the plunger 23 of which reciprocates the toggle cross head 24. The toggle linkage connects the cross head, clamp platen and moving platen in such a way that the mold halves 11, 12 are clamped shut when toggle center 25 is brought into line between centers 26, 27 to thereby form a column to resist the expansive force of injection. The linkage comprises a symmetrical system of links having on each side of center a ternary link 30 and two different binary links 31, 32. The first or connecting binary link 31 has two pin joints and connects the cross head to the middle pin joint of the ternary link.

Long binary link 32 connects the moving platen with the pin joint 25 on the ternary. A plurality of bearing 34, 35 supports, commonly called steeples, connect the moving platen to the long binary link and the fixed platen with the ternary link. There may be plural toggle linkages of like structure disposed across the machine and connected to the same crosshead. The platens rest on a machine frame the upper surface of which provides a pair of longitudinal parallel ways 38 on which the moving platen is supported and reciprocates. The nozzle platen is preferably keyed at 39 to a fixed place relative to the frame, while the clamp platen 7 is intended to be moved during clamp adjusting and when under clamping load rests on the upper surface of the way.

Figure 2:
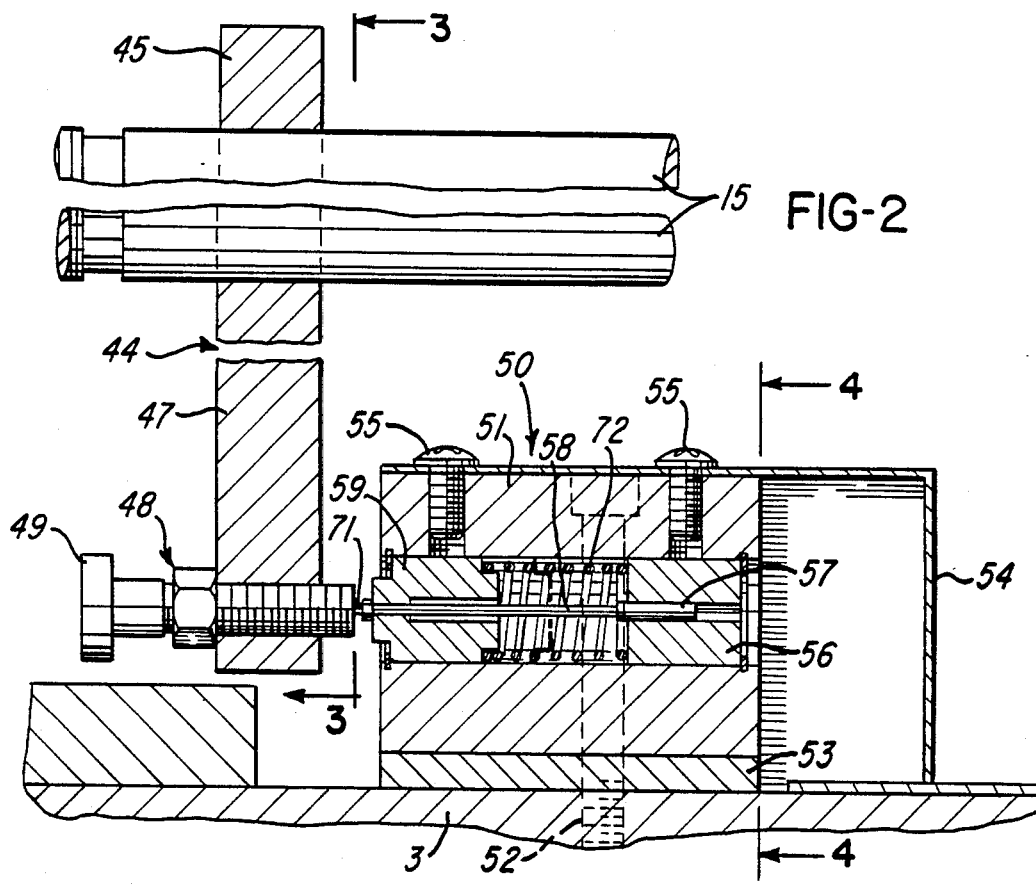
FIG. 2 is an enlarged partial side view illustrating the attachment of the monitor of FIG. 1 to the toggle machine frame near the backing platen.
Figure 4:
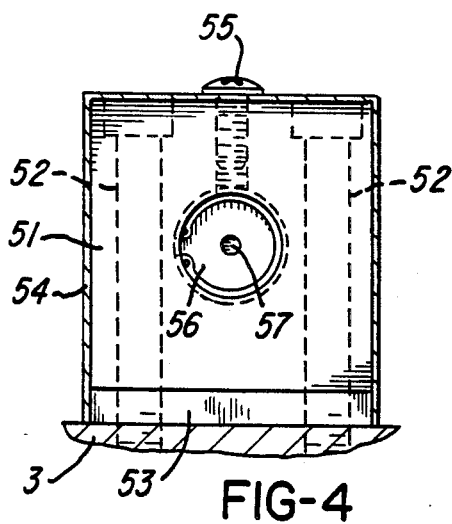
FIG. 4 is a section along 4—4 of FIG. 2 depicting the monitor and its attachment to the toggle machine frame.
Figure 3:
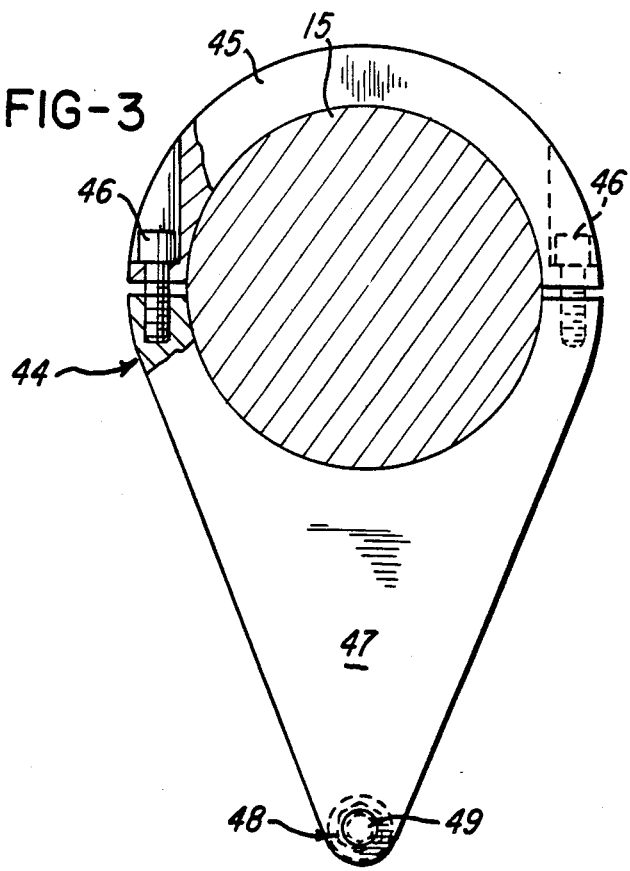
FIG. 3 is a section along 3—3 of FIG. 2 of the link illustrated in FIG. 1, 2.

The back platen 7, as is well known in the art, supports a die height adjustment motor 40, an adjusting nut 41 and sprocket 42 on each tension rod, and an adjusting chain 4 threaded to connect the aforesaid motor with all four sprockets, hence tie rods, so that all can be adjusted simultaneously in setting die height and therefore setting clamping force. This is all well known in the art FIGS. 1, 2, 3 illustrate a link assembly 44 clamped to one of the lower tie (or strain) rods 15 adjacent the backing platen 7, i.e. adjacent the moving end of such tie rod 15. Link assembly 44 includes clamping ring 45 secured by screws 46 to link 47 to clampingly engage rod 15. An adjustable mechanical contact assembly 48—comprising an adjusting screw 49 and locknut—threadably engages the tapped hole in the depending end of the link and is supported with the contact end facing the monitor assembly or sensing means 50 adjusting screw is set (and lock nut tightened to maintain) to engage the end 71 of probe 58 of sensing means 50 when the mold 11, 12 is open and the care bushing 59 is in the phantom line position in FIG. 2.

Monitor assembly 50 has a housing 51 secured by a pair of screws 52 to mounting pad 53 to which a cover 54 is attached by another pair of screws 55, tapped holes receiving the various screws. The housing supports the LVDT or transducer element 56, a core 57, a probe 58 extending from the core into the bushing 59 to which it is attached, and a spring resiliently biasing apart the bushing and LVDT. Removable retainer rings of any suitable commercial type hold the various elements of the monitor in said housing.

A suitable switching system 60 (FIGS. 5, 6) is provided to apply electricity from DC source 62 to this system so that LVDT 51 is turned on at zero load and turned off after each cycle. The means 51 is preferably an LVDT but may be a linear or even rotary potentiometer. As shown the LVDT is a coil or transducer secured to the frame with a core 57 that moves relative to it.

The monitor is completed by cover 54, providing the sides. Electrical leads 80 from the LVDT are lead through the housing of the monitor to a suitable power supply 62.

FIGS. 5 and 6 illustrate schematically portions of the LVDT transformer, its core, and its connection to a suitable meter 82 which reads out the signal indicating the amount of movement when clamping tonnage is applied by moving the cross heads so that the toggle linkage come on by clamping tonnage.

FIG. 6 also schematically shows a suitable and preferred manner of connecting the instant system to a source of electricity 62 by using a cam 84 operated switch 85. The meter 82 of FIG. 5 is illustrated in this circuit.

The manner of operating the present system should be apparent from the foregoing. With the mold 11, 12 open, as the FIG. 1 phantom (dot/dash) lines show, the adjusting motor 40 is operated an amount indicated by one or more previous clampings which has the effect, as is well-known, of moving the back platen 7 back and forth along the tie rods 15 a predetermined amount. This being done, the toggle cylinder 22 starts to close the mold 11, 12, at which time the switch 60 of FIGS. 1, 6 is closed to connect the power supply 62 to the sensor 50. When the toggle linkage is brought fully on center (25, 26, 27 being along one line) to close mold 11, 12 as indicated in the solid lines of FIG. 1, a full clamping pressure is then being applied and therefore the tie rods 15 are stretched their maximum amount which is directly proportional to the clamping tonnage.

Movement of platen 7 to the left of FIGS. 1-4 causes motion of slug 57 toward the left and relative to LVDT transducer 56. This is reflected in a reading on meter 82 in FIGS. 5 and 6. This reading is directly proportional to the clamping tonnage, this relationship being linear as long as the tie rods are within their elastic limit.

Thereafter, clamp cylinder 22 is operated, the crosshead 23 is moved to the rear and the molds are again open, whereupon the system returns to zero tie rod load and a further clamping tonnage adjustment of the tie rod may be made in the manner as indicated above.

A similar operation would take place if a linear potentiometer were used instead of the LVDT, likewise a rotary potentiometer.

I claim:

1. A toggle plastic injection molding machine comprising
    a machine frame;
    a back platen;
    a fixed platen;
    a plurality of tie rods connected between said back and fixed platens to resist forces tending to move said platens apart and to place said tie rods in tension;
    ways supported on said frame between said platens;
    a movable mold platen supported on said ways between said back and fixed platens with said tie rods slidably passing therethrough;
    clamping means including a toggle linkage between said back platen and said movable platen for moving the latter on said ways to and from said fixed platen;
    said tie rods being placed in tension when respective mold halves on said moving and fixed mold platens are clamped together by said clamping means moving said moving platen toward said fixed mold platen;
    a link attached to one of said tie rods adjacent to said back platen;
    a mechanical contact supported on said link facing toward said movable platen to move in proportion to the elongation of said tie rod;
    a sensing means supported from said frame between said back and movable platens to sense tie rod stretch by relative motion between said contact and said frame and to provide a signal representative of and responsive to such relative motion; and
    a movable probe element part of said sensing means extending therefrom toward said contact and being engageable by said contact.

2. A toggle plastic injection molding machine according to claim 1, wherein:
    said link further includes clamping means for securing said link to said one tie rod.

3. A toggle plastic injection molding machine according to claim 1, wherein:
    said sensing means is a linear variable differential transformer having a core, a resilient bias means, and said probe element thereof supports said core and is resiliently biased toward said contact by said bias means.

4. A toggle plastic injection molding machine according to claim 1, wherein:
    said mechanical contact further includes an adjusting screw threadably engaging said link.

5. A toggle plastic injection molding machine according to claim 1, wherein:
said link further includes clamping means for securing said link to said one tie rod;
said sensing means is a linear variable differential transformer having a core, a resilient bias means, and said probe element thereof supports said core and is resiliently biased toward said contact by said bias means; and
said mechanical contact further includes an adjusting screw threadably engaging said link.

6. A toggle plastic injection molding machine according to claim 1, wherein:
said sensing means is a linear variable differential transformer having a core, a resilient bias means, and said probe element thereof supports said core and is resiliently biased toward said contact by said bias means; and
said mechanical contact further includes an adjusting screw threadably engaging said link.

7. A toggle plastic injection molding machine according to claim 1, further comprising:
means responsive to said sensing means for displaying an indication of said a signal representative of the amount of said relative motion.

8. A toggle plastic injection molding machine according to claim 7, wherein:
said sensing means is a linear variable differential transformer having a core, a resilient bias means, and said probe element thereof supports said core and is resiliently biased toward said contact by said bias means.

9. A toggle plastic injection molding machine according to claim 7, wherein:
said mechanical contact further includes an adjusting screw threadably engaging said link.

* * * * *